Aug. 28, 1962 H. F. EDWARDS 3,050,999
CAPACITY UNIT FOR LIQUID QUANTITY GAUGES
Filed Aug. 20, 1957
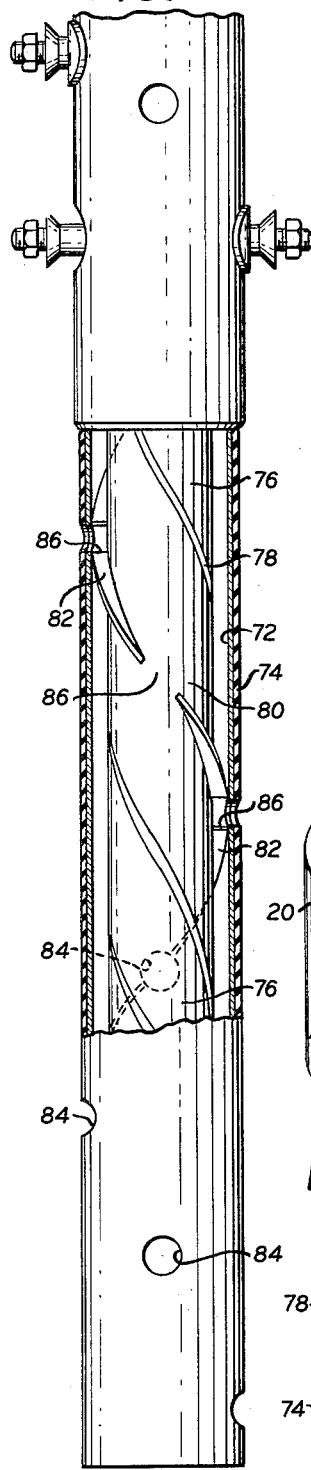
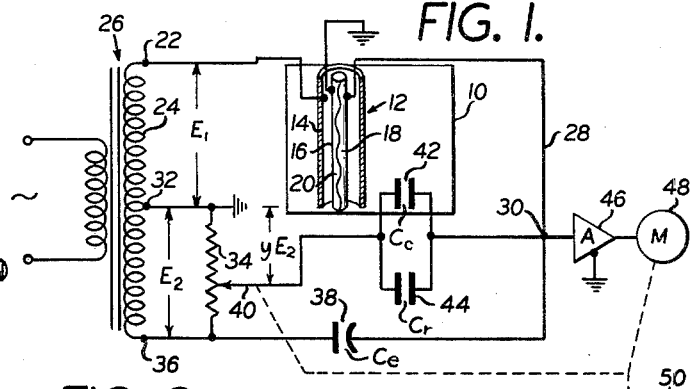
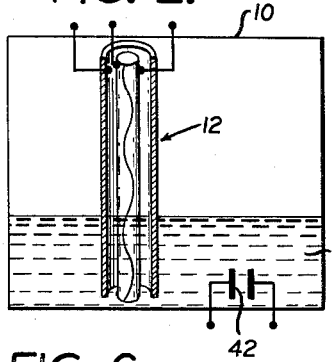
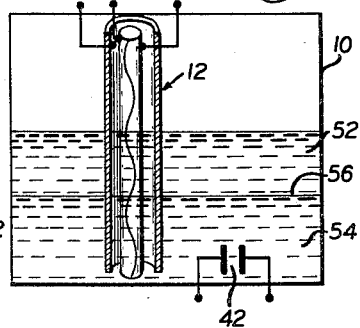
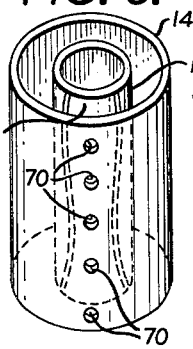
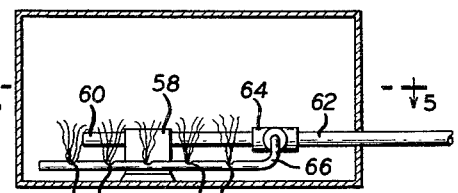
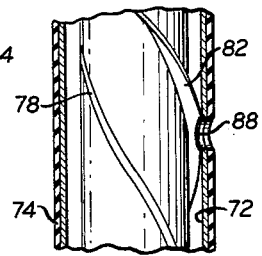
INVENTOR
HARRISON F. EDWARDS
BY
Churchill, Weymouth & Engel
ATTORNEYS.

3,050,999
CAPACITY UNIT FOR LIQUID QUANTITY GAUGES
Harrison F. Edwards, Ossining, N.Y., assignor to Simmonds Precision Products, Inc., a corporation of New York
Filed Aug. 20, 1957, Ser. No. 679,161
6 Claims. (Cl. 73—304)

The present invention relates to capacitance type liquid quantity gauges.

In a capacitance type liquid quantity gauge the quantity of liquid in a container is measured by locating within the container a measuring condenser having spaced plates or electrodes for immersion in the liquid contents of the container to an extent dependent upon the level of the liquid therein. As the liquid level changes in the container the wetted area of the condenser electrodes changes and, therefore, assuming no change in dielectric constant of the liquid, the condenser capacity will change. In order to provide an indication of the level of liquid within the container, it is merely necessary to measure the capacity of the condenser and through calibration convert such measurement into units representative of liquid level.

The circuit arrangements for measuring the capacity of the measuring condenser and converting it into the desired indication may take several forms depending upon the anticipated variation in characteristics of the liquid to be measured and the particular quantum which is to be indicated. If it is expected that the dielectric constant of the liquid in the container will differ from time to time and the quantum to be indicated is liquid height or volume, it is necessary to introduce a compensation for the changes in dielectric constant in order to obtain accurate measurements. It is known for this purpose to provide a reference condenser which is fully immersed at all times in a sample of the liquid to be measured. If the capacity of the measuring condenser is then compared with the capacity of the immersed reference condenser it is theoretically possible to achieve perfect accuracy.

If it is desired that the indications represent the mass of liquid in the container a reasonable approximation may be obtained in a known manner by employing a suitable combination of a fully immersed reference condenser and a dry reference condenser. The accuracy of the above measurements is dependent upon the assumption that the dielectric constant of the liquid between the electrodes of the immersed reference condenser is equal to, or the same as, the dielectric constant of the liquid between the electrodes of the measuring condenser throughout its height. Unfortunately in practice this situation is not always attained.

Solely for purposes of illustration the measurement of the quantity of fuel in aircraft fuel tanks will be considered and the invention will be described with reference thereto. In jet aircraft particularly it is common practice to mix types of fuel when a plane is refueled. This results from the fact that the usual jet engine will operate satisfactorily on an extremely wide range of liquid hydrocarbons. Considerations of cost, logistics and so forth often give rise to the use of whatever fuel happens to be available. Thus, the following situation develops. A given fuel tank contains two different fuels of widely differing densities. By reason of well known physical principles the lighter fuel will float upon the surface of the heavier fuel. In the capacity type gauging systems now employed, the immersed reference condenser is normally located at the lowermost point in the tank. Thus, the reference condenser will sense the dielectric constant of the heavier fuel which normally will be greater than the dielectric constant of the lighter fuel. However, a portion of the measuring condenser corresponding to the amount of lighter fluid in the tank will have its capacity determined by a dielectric constant other than that sensed by the reference condenser. It is apparent that the resultant indication of the gauge will be in error. Experimental results have indicated errors as great as 10% and possibly larger. For convenience hereinafter, the phenomenon of separation of fuels or liquids giving rise to the error described above will be referred to as stratification.

In accordance with one aspect of the present invention, means are provided in association with the container for agitating the liquid contents of the container such that the immersed reference condenser continually senses the average dielectric constant of the contents of the container. Such means may take the form of a circulating system employing a pump and spraying means or nozzles disposed in the container so as to create a stirring or mixing action.

It has been found, however, that providing means for agitating the liquid contents of a container in combination with measuring condensers now in use on aircraft does not completely eliminate the error due to stratification. This is due to the fact that the measuring condensers now in use are constructed with concentric spaced cylindrical electrode structures having openings near the bottom for allowing ingress of fuel and further openings near the top for permitting egress of the air or fuel vapor lying above the fuel level. For structural reasons the remainder of the condenser structure has remained imperforate. Therefore, in spite of the provision of means for agitating the liquid within the principal volume of the container, it is still possible for a condition of stratification to prevail within the protective confines of the condenser electrode structure.

Therefore, in accordance with another aspect of the present invention, the measuring condenser is provided with means associated therewith for causing the liquid between its electrodes to be substantially identical in character and homogeneity with the rest of the liquid in the container. Such means may take the form of a plurality of liquid transfer perforations in the outer electrode structure disposed in a particular fashion as will be more fully described hereinafter.

The invention will be better understood after reading the following detailed description thereof with reference to the appended drawings wherein:

FIGURE 1 is a simplified schematic circuit diagram of a typical capacitance type liquid quantity gauge to which the present invention may be applied;

FIGURE 2 is a diagrammatic representation of a container provided with a measuring condenser and an immersed reference condenser and holding a quantity of liquid of a given density;

FIGURE 3 is a diagrammatic representation similar to FIGURE 2 illustrating the effect of adding a denser or heavier liquid to the container;

FIGURE 4 is an elevational view, partly in section, illustrating an arrangement for agitating the liquid contents of a container;

FIGURE 5 is a horizontal sectional view taken on line 5—5 of FIGURE 4;

FIGURE 6 is a diagrammatic representation of a measuring condenser provided with a perforated outer electrode in accordance with the present invention;

FIGURE 7 is an elevational view, partly in section, of another form of measuring condenser illustrating the distribution of the perforations in the outer electrode structure in accordance with the present invention; and, FIGURE 8 is a fragmentary sectional view of a measuring condenser similar to FIGURE 7 illustrating a modification thereof.

In FIGURE 1 there is shown schematically a circuit which in theory is capable of indicating the mass of liquid within a container within the limits of accuracy of the basic assumption that the relationship between dielectric constant and density can be represented by the equation $$\frac{K-1}{D} = M + N(K-1)$$

For this purpose, the container 10 has mounted therein a measuring condenser designated generally by the numeral 12. As shown, the measuring condenser includes a first cylindrical electrode member 14 and a second cylindrical electrode member 16 telescoped one within the other. In a typical installation the electrode member 14 is formed from a tubular or cylindrical support of insulating material comparatively light in weight but having substantial structural strength. The actual electrode itself is in the form of a metallic layer or coating mounted or supported on the internal surface of the cylinder 14. In similar manner, the cooperating electrode of the condenser takes the form of a coating or layer 18 supported on the outer surface of a hollow tube or cylinder of insulating material so as to constitute the electrode member 16. As indicated in the drawing, the electrode 18 occupies less than the total surface area of the cylinder 16. This is common practice when the condenser is employed with an irregularly shaped tank in which case the electrode 18 is profiled or shaped so that its horizontal dimensions bear a desired relationship to the horizontal cross-sectional area of the tank at successive levels. When a profiled electrode is employed, it is common practice to provide on the remaining surface of the electrode member 16 a further electrode 20 which is insulated from electrode 18 and which can be connected to ground as shown for the elimination of fringe effects.

In order to measure changes in capacity of the condenser 12 due to changes in liquid level or volume and convert the measurement into an indication of mass, the electrode 14 is connected to a terminal 22 of the secondary winding 24 of a transformer 26. As previously mentioned, electrode 20 is connected to ground. Electrode 18 is connected by the lead 28 to a common output point 30. The winding 24 is provided with a tap 32 which is connected to ground. A rebalancing potentiometer 34 has its resistance element connected between the tap 32 and the terminal 36 at the free end of the winding 24. A capacitor 38 having a fixed capacity is connected between the points 30 and 36. The slider 40 of the potentiometer 34 is connected to one plate of an immersed reference condenser 42 while the other plate of the condenser 42 is connected to the output point 30. As shown, the condenser 42 is disposed adjacent the bottom of the container or tank 10. A second fixed capacitor 44 is connected in parallel with the immersed condenser 42.

An amplifier and phase sensitive detector 46 has its input connected between the common output point 30 and ground. The output of the detector 46 is coupled to a rebalancing or servo motor 48 which in turn drives the slider 40 and an indicator 50.

The choice of circuit constants will be understood from the following analysis of the circuit operation. The capacity of the measuring condenser 12 may be designated by the symbol $C_t$ and can be represented by the expression $C_{to} + VC_{to}(K-1)$ where $C_{to}$ represents the dry capacity of the condenser, K represents the dielectric constant of the liquid between its plates and V represents the fraction of the total area of the condenser plates which is wetted by the liquid. The following additional symbols and relationships are hereby assumed:

$C_e$ = capacity of capacitor 38;
$C_r$ = capacity of capacitor 44;
$C_c$ = the total capacity of the condenser 42
$$= C_{co} + C_{co}(K-1)$$

$E_1$, $E_2$ and $yE_2$ represent the voltages as shown on the drawing with $y$ representing the fractional part of the potentiometer 34 selected by the slider 40.

It has previously been shown that for a wide range of jet fuels the dielectric constant and density can be related within a maximum error of a few percent by the expression:

$$\frac{K-1}{D} = M + N(K-1) \qquad (1)$$

As a first step, the circuit constants should be chosen such that $$E_1 C_{to} = E_2 C_e \qquad (2)$$

Then, the resultant currents in the circuit flowing between point 30 and ground can be represented by the equation:

$$E_1 V C_{to}(K-) = yE_2 C_r + yE_2 C_{co} + yE_2 C_{co}(K-1) \qquad (3)$$

For convenience assume $E_1 = E_2$, i.e. point 32 in FIGURE 1 is a center tap. Then Equation 3 becomes after consolidating terms and solving for y:

$$y = \frac{VC_{to}(K-1)}{C_r + C_{co} + C_{co}(K-1)} \qquad (4)$$

Let:

$$C_r = (M-N)C_{to} \qquad (5)$$

and $$C_{co} = NC_{to} \qquad (6)$$

Substituting terms Equation 4 becomes:

$$y = \frac{VC_{to}(K-1)}{(M-N)C_{to} + NC_{to} + NC_{to}(K-1)}$$
$$= \frac{VC_{to}(K-1)}{MC_{to} + NC_{to}(K-1)} = \frac{V(K-1)}{M + N(K-1)} \qquad (7)$$

Now, substituting for $M + N(K-1)$ the term $$\frac{K-1}{D}$$

from Equation 1, and Equation 7 reduces to:

$$y = VD \qquad (8)$$

Since V in Equation 8 can be made proportional to volume by suitable profiling of the measuring condenser, it follows that y is proportional to the mass of the liquid in the container. The circuit constants should be chosen to satisfy the various assumptions made above.

The above described circuit will perform the desired function so long as the dielectric constant of the liquid between the plates of the condenser 42 is equal to the dielectric constant of the liquid between the plates of the condenser 12. But consider the following possibility. As shown in FIGURE 2, the tank 10 is partially filled with a liquid 52 having a given density. As is common, the measuring condenser 12 is provided with openings at the bottom and near the top. A certain amount of the liquid 52 is confined between the electrode members of condenser 12. As shown in FIGURE 3, if the contents of the tank 10 are augmented by a liquid of greater density than liquid 52, the liquid 52 will float upon the denser liquid 54. This will cause a stratification line 56. It will be apparent from the drawing that in such case the immersed condenser 42 senses the dielectric constant solely of the liquid 54 whereas a substantial part of the capacity of condenser 12 is determined by the lighter liquid 52. To the extent that the assumption as to the relationship of dielectric constant and density is valid, the dielectric constant of liquid 52 will be lower than the dielectric constant of liquid 54. The error thus introduced should be obvious.

It has been assumed in describing FIGURE 3 that the second liquid was added in such manner that stratification occurred throughout the entire tank as well as within the confines of the condenser 12. Such a condition would prevail if a tank containing mixed fuels was permitted to sit immobile for an extended period of time as would occur if an aircraft was left in the hangar for several days. If has been found that even if the liquid outside of the condenser 12 should become mixed due to the disturbance or agitation caused by adding additional liquid, the shielding afforded by the electrode structure of the condenser 12 is sufficient to prevent suitable mixing action within its confines. With a profiled condenser the gauge would still be in error.

It has thus been found necessary for optimum results in accordance with the present invention, to introduce both a means for agitating the liquid and a further means for permitting access of the agitating force to the interior of the condenser 12. A suitable agitating arrangement is shown in FIGURES 4 and 5. The conventional fuel pump normally located within an aircraft fuel tank is shown at 58 provided with an inlet 60 and a discharge conduit 62 for supplying the engines. In order to afford agitation, a T fitting 64 is inserted in the discharge conduit 62 and a small diameter conduit 66 is thereby tapped into the discharge side of the pump 58. A plurality of orifices 68 are distributed throughout the length of the conduit 66 for spraying the fuel supplied thereto. By appropriate proportioning of the conduit 66 it can be arranged to by-pass or divert about 5% to 10% of the pump output for agitating purposes. It is to be understood, although not shown in FIGURES 4 and 5, that the condensers forming part of the gauging system would also be located in the tank.

Instead of using the already existing fuel pump, it is also possible to provide a separate or auxiliary pump solely for the purpose of agitation.

Reference should now be had to FIGURE 6 wherein there is shown one arrangement for providing the measuring condenser with means permitting proper mixing action to take place between its plates so long as some agitation takes place within the tank. The condenser is assumed to be formed in the same manner as condenser 12 described in connection with FIGURE 1 and, therefore, similar reference numerals are employed. As previously mentioned, the condenser has upon its inner electrode member an electrode which is grounded in use. This provides an inactive condenser portion or zone. In order to provide for proper liquid circulation, the outer electrode member is provided with a plurality of spaced liquid transfer perforations 70. The perforations should be located wholly within the inactive zone so that the capacity of the active zone will be determined independent thereof and, wherever possible, they should be located adjacent the insulating spacers normally disposed between the inner and outer electrode members for maintaining the space therebetween. This is to prevent excessive weakening of the condenser structure which is normally constructed to close tolerances in order to minimize over-all weight. A preferred condenser construction will now be described with reference to FIGURE 7.

The condenser in FIGURE 7 is constructed in the manner described and claimed in the application of Theodore Weber, Jr., Serial No. 496,214, filed March 23, 1955, now Patent No. 2,802,975, and assigned to the same assignee as the present application. The outer electrode of the condenser consists of a metallic layer 72 carried on the inner surface of an insulating tube 74. The inner active electrode consists of a spiral metallic layer 76 supported on the outer surface of an insulating tube 78. An inactive electrode 80 which is arranged to be grounded in operation is provided in the form of a second spiral metallic layer supported on the outer surface of the insulating tube 78 between successive turns of the spiral 76. As shown in the drawing, the electrode 80 is spaced from the electrode 76 and thereby insulated therefrom. In accordance with the aforementioned application Serial No. 496,214 the spacing between the inner and outer electrode members is established and maintained by a spiral insulating spacer 82. In accordance with the present invention a plurality of liquid transfer perforations 84 are provided in the outer electrode structure 72, 74 at points overlying the spacer 82. As shown in FIGURE 7, the spacer lying immediately under the perforations 84 is removed at 86. For convenience the gap provided may be equal to the diameter of the perforation. The perforations are shown located at 90° intervals around the condenser along the spiral path of the spacer 82. Under certain conditions more or fewer perforations may be provided. With this construction it has been found that the introduction of the perforations has little or no adverse effect upon the over-all rigidity of the condenser and its stability under vibration.

In FIGURE 8 a modification of the structure shown in FIGURE 7 is illustrated. Instead of entirely removing a section of the spacer below the transfer perforation it may be preferable to merely relieve the spacer slightly below the opening as shown at 88.

The invention has been described with reference to certain preferred embodiments thereof. It will be understood by those skilled in the art to which the invention appertains that certain changes may be effected without departing from the spirit of the invention.

What I claim is:

1. A liquid quantity gauging system comprising a measuring condenser having a pair of spaced concentric cylindrical electrode members of self-supporting insulating material provided with metallic electrodes on the confronting surfaces thereof, at least one electrode occupying less than the total area of the insulating surface upon which it is supported so as to provide throughout the length of the condenser an inactive zone, insulating spacer means disposed between said electrode members entirely within said inactive zone for establishing and maintaining said spaced concentric relationship, openings adjacent opposite ends of said condenser for admitting liquid to the space between said electrode members, and a plurality of liquid transfer perforations in the wall of the outer electrode member distributed along the greater part of its length and all located wholly within said inactive zone, said condenser being adapted for mounting in a container so as to be immersed in the liquid therein and to receive the liquid in the space between said electrode members as a function of the quantity of liquid in the container; a reference condenser for total immersion adjacent the bottom of the container in the liquid in the container; a gauging circuit for indicating the quantity of liquid in the container as a function of the relative capacities of said condensers; and means for agitating the liquid contents of said container such that said reference condenser continually senses the average dielectric constant of the liquid contents of the container, whereby the liquid between the electrodes of the measuring condenser is substantially identical in character and homogeneity with the rest of the liquid in the container and the errors due to liquid stratification are substantially eliminated such that the desired relationship is obtained between the indications of the gauging circuit and changes in the dielectric constant of the liquid between the electrodes of the measuring condenser.

2. A liquid quantity gauging system according to claim 1, wherein said one electrode which occupies less than the total area of the insulating surface upon which it is supported extends longitudinally of the condenser along a spiral path thereby providing a spiral active zone and an adjacent spiral inactive zone, and both said spacer means and said perforations are located in said inactive spiral zone.

3. A measuring condenser for a liquid quantity gauge comprising a pair of spaced concentric tubular electrode members having electrode surface portions and adapted to be mounted with openings adjacent opposite ends thereof in a container for immersion in the liquid therein to receive the liquid through said openings in the space between said electrode members as a function of the quantity of liquid in the container, at least one of said electrode members having two mutually insulated electrode surface portions each extending longitudinally of the condenser along a spiral path and forming with the other electrode member two condenser sections having substantially independent zones of dielectric media, and a plurality of liquid transfer perforations in the wall of the outer electrode member distributed along the greater part of its length along a spiral path and all located wholly within one condenser section of a sufficient size and number that the character of the liquid between the electrode members will tend to be homogeneous and continually representative of the liquid in the container irrespective of change in the character of the latter so long as some agitation takes place, while the capacity of the condenser section other than said one section will be determined independent of said perforations.

4. A measuring condenser for a liquid quantity gauge comprising a pair of spaced concentric tubular electrode members having electrode surface portions and adapted to be mounted with openings adjacent opposite ends thereof in a container for immersion in the liquid therein to receive the liquid through said openings in the space between said electrode members as a function of the quantity of liquid in the container, at least one of said electrode members having two mutually insulated electrode surface portions each extending longitudinally of the condenser along a spiral path and forming with the other electrode member two condenser sections having substantially independent zones of dielectric media, an elongated spiral strip of non-conductive material disposed in the space between said electrode members in space maintaining engagement therewith extending wholly within one zone of said dielectric media, and a plurality of liquid transfer perforations in the wall of the outer electrode member distributed along the greater part of its length along a spiral path overlying said spiral strip, said strip being relieved under each perforation, the size and number of said perforations being such that the character of the liquid between the electrode members will tend to be homogeneous and continually representative of the liquid in the container irrespective of change in the character of the latter so long as some agitation takes place, while the capacity of the condenser section having the zone of dielectric media other than said one zone will be determined independent of said perforations.

5. A measuring condenser according to claim 4, wherein the relieving of the spiral strip comprises gaps therein equal to the diameter of a perforation.

6. A measuring condenser for a liquid quantity gauge comprising a pair of spaced concentric cylindrical electrode members of self-supporting insulating material having metallic electrodes affixed to the confronting surfaces thereof and adapted to be mounted with openings adjacent opposite ends thereof in a container for immersion in the liquid therein to receive the liquid through said openings in the space between said electrode members as a function of the quantity of liquid in the container, at least one of said electrode members having its electrode extending longitudinally of the condenser substantially throughout its length and shaped to occupy less than the total area of the respective confronting surface of said insulating material and to form with the other electrode member a condenser section having a given zone of dielectric media, insulating spacer means disposed between said electrode members wholly without said given zone of dielectric media for establishing and maintaining said spaced concentric relationship of the members, and a plurality of liquid transfer perforations in the wall of the outer electrode member distributed along the greater part of its length and all located wholly without said given zone of dielectric media of a sufficient size and number that the character of the liquid between the electrode members will tend to be homogeneous and continually representative of the liquid in the container irrespective of change in the character of the latter so long as some agitation takes place, while the capacity of said condenser section will be determined independent of said spacing means and said perforations.

References Cited in the file of this patent

UNITED STATES PATENTS

| 1,342,947 | Duncan | June 8, 1920 |
| 2,409,073 | Sias | Oct. 8, 1946 |
| 2,699,523 | Meyers | Jan. 11, 1955 |
| 2,726,936 | Bernheim | Dec. 13, 1955 |
| 2,767,584 | Franzel et al. | Oct. 23, 1956 |
| 2,802,975 | Weber | Aug. 13, 1957 |
| 2,824,449 | Childs | Feb. 25, 1958 |

FOREIGN PATENTS

| 696,522 | Great Britain | Sept. 2, 1953 |